US008761745B2

(12) United States Patent
Gallant

(10) Patent No.: US 8,761,745 B2
(45) Date of Patent: Jun. 24, 2014

(54) CALL FORWARDING ON SCREENING

(75) Inventor: John K. Gallant, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2708 days.

(21) Appl. No.: 10/101,199

(22) Filed: Mar. 18, 2002

(65) Prior Publication Data

US 2002/0137490 A1 Sep. 26, 2002

Related U.S. Application Data

(60) Provisional application No. 60/276,923, filed on Mar. 20, 2001, provisional application No. 60/276,953, filed on Mar. 20, 2001, provisional application No. 60/276,955, filed on Mar. 20, 2001, provisional application No. 60/276,954, filed on Mar. 20, 2001.

(51) Int. Cl.
  *H04M 3/42* (2006.01)
(52) U.S. Cl.
  USPC ...... 455/417; 455/411; 455/461; 379/142.01; 379/142.05
(58) Field of Classification Search
  USPC .............. 455/414.1, 415, 417, 411, 410, 461; 379/142.01, 142.05; 709/206
  See application file for complete search history.

(56) References Cited

U.S. PATENT DOCUMENTS

| 6,405,035 | B1 * | 6/2002 | Singh ......................... 455/414.1 |
| 6,587,683 | B1 * | 7/2003 | Chow et al. ................... 455/417 |
| 6,631,258 | B1 * | 10/2003 | Chow et al. ................... 455/417 |
| 6,728,543 | B2 * | 4/2004 | Immonen et al. ............. 455/445 |
| 6,741,688 | B1 * | 5/2004 | Yau ........................... 379/142.01 |
| 6,779,020 | B1 * | 8/2004 | Henrick ....................... 709/206 |
| 6,798,772 | B2 * | 9/2004 | Bergman et al. .............. 370/354 |

OTHER PUBLICATIONS

Schulzrinne et al., "SIP Call Control Services", Internet Engineering Task Force, Internet Draft, Jun. 17, 1999.
Falstrom, P., "E.164 Number and DSN", Internet Engineering Task Force, Request for Comments 2916, Sep. 2000.
Schulzrinne et al., "RTP: A Transport Protocol for Real-Time Applications", Internet Engineering Task Force, Request for Comments 1889, Jan. 1996.
Handley et al., "SIP: Session Initiation Protocol", Internet Engineering Task Force, Request for Comment 2543, Mar. 1999.

* cited by examiner

*Primary Examiner* — Wayne Cai
*Assistant Examiner* — Chuck Huynh

(57) ABSTRACT

An approach for providing telephony and other services over a data network is disclosed. A user profile information is maintained for a party to control the screening of inbound communications requests intended for the party. Means are disclosed for redirecting an inbound call to a designated alternative location if it is determined that the inbound call meets at least one screening criterion. The user profile information controls screening criteria and disposition of calls that are intercepted by the screening process.

20 Claims, 8 Drawing Sheets

CALL FORWARDING ON SCREENING

RELATED APPLICATIONS

This application is related to, and claims the benefit of the earlier filing date under 35 U.S.C. §119(e) of, U.S. Provisional Patent Application No. 60/276,923, filed Mar. 20, 2001, entitled "IP Communications," U.S. Provisional Patent Application No. 60/276,953, filed Mar. 20, 2001, entitled "IP Communications," U.S. Provisional Patent Application No. 60/276,955, filed Mar. 20, 2001, entitled "IP Communications," and U.S. Provisional Patent Application No. 60/276,954, filed Mar. 20, 2001, entitled "IP Communications"; the entireties of which are incorporated herein by reference.

FIELD OF THE INVENTION

The present invention relates to a communications system, and is more particularly related to providing customized handling of communications requests.

BACKGROUND

One type of feature that is available to some telephone users is call screening. For example, a first party who does not wish to receive calls from a second party may have a telephone service provider detect and prevent any call attempts inbound from the second party. This service is contracted for a particular line or subscriber loop, such as a residential phone line, associated with the first party. Typically for an additional charge, the service provider will maintain a list of blocked telephone numbers on behalf of the first party and will examine the caller telephone number of all inbound calls. According to the screening options configured for the first party, an inbound call may be prevented if it meets, or fails to meet, certain criteria. In addition to blocking inbound calls from specific originating numbers, screening options may be configured to similarly block calls wherein the caller number is unknown, unrecognized, or not a member of a specified set.

A special type of call screening has recently become available in conventional residential telephone service wherein any inbound calls, or at least any that do not convey caller identification, are first greeted by an automated system which instructs the caller that the called party does not accept unsolicited calls. In many cases, this is primarily intended to stop telemarketing "cold calls." Such a system may then invite the caller to record a name to be announced to the called party so that the called party may accept or decline the call. Alternatively or additionally, the screening system may solicit a special numerical code from the caller to allow the call to go through. The numerical code is given to the caller by the called party in advance of the call. For example, a special code may be given to family members so they may satisfy the screening function. In some implementations, when a family member calls from their home and the caller identification is provided, the system may forego such screening. However, screening measures are still invoked whenever the family member calls from a different location, such as a place of employment.

This method of screening is cumbersome and, in many circumstances, equally inconveniences all inbound callers and delays call placement. Even where the use of numerical passcodes allow some trusted parties to traverse the screening mechanism, this burdens desirable callers with having to remember perhaps many such codes associated with various family members. Furthermore, there is no real differentiation of explicitly blocked callers, either by originating telephone number or other means, to ensure that call attempts by such callers are not troublesome to the called party. For example, an unwelcome caller may repeatedly access the call screening system and record a name announcement, whereupon the system will then ring the called party's telephone line and convey the recorded name.

When a called party subscribes to such a screening feature, the choices of disposition are limited and the handling options are provisioned by the telephone service provider. The party may not freely and easily alter the designation and desired handling of blocked calls.

A fundamental difficulty with all manner of prior art call screening approaches is that, when a particular caller is blocked, the caller is not notified that the call has been blocked. The caller will simply receive the same busy signal as if the line were simply occupied with another call. Consequently, the caller may make repeated attempts to reach the called party, unaware that such attempts will be futile. Continued attempts may waste time or resources of the service provider or the parties. It is conceivable that this wastefulness may be compounded if the calling party is able to invoke any form of an automatic retry feature.

SUMMARY OF THE INVENTION

The need for an improved call screening service is addressed by the present invention whereby an inbound call that fails screening may be forwarded to destination, such as a voice mail system or an automated announcement.

In accordance with one aspect of the present invention, the handling of blocked inbound calls may be configured for an individual subscriber or at an organizational level, such as a default handling applied to all users associated with a virtual private network dial plan.

The present teachings further consider that, between the extremes of complete allowance and complete blockage of calls, alternative handlings may be desirable and may be especially facilitated in the context of newer voice-over-packet networks.

Furthermore, in the context of recently developed service control schemes, the present invention provides for the novel ability of performing call screening based upon the identity of the calling party rather merely the telephone number that the party is calling from.

In accordance with exemplary embodiments of the present invention, this address can be a voicemail box, an announcement, an assistant's phone number, or legal representative or official spokesperson, general receptionist.

In accordance with an aspect of the present invention, a technique for call forwarding conditioned on call screening is provided which allows for screening criteria to be expressed in terms of both originators at that are permitted and those which are not permitted.

In accordance with an aspect of the present invention, a technique for call forwarding conditioned on call screening is provided wherein the originating and terminating parties, as well as screening criteria, may be specified using a variety of address types, including but not limited to IP addresses, uniform resource locators, universal resource identifiers, public telephone numbers, private telephone numbers, or any form of character string in a computing system. In servicing a given communications request, a communications system embodying the present invention may concurrently handle any or all of these address types.

In accordance with aspects of the present invention, a user may readily and frequently alter the behavior of the call forwarding on screening feature without requiring manual intervention by the service provider.

In accordance with another aspect of the present invention, a location server, as well as a method for operating the location server, is provided for effecting call control in a communications system and supporting call forwarding on screening.

Still other aspects, features, and advantages of the present invention will be readily apparent from the following detailed description, simply by illustrating a number of particular embodiments and implementations, including the best mode contemplated for carrying out the present invention. The present invention is also capable of other different embodiments and its several details can be modified in various respects without departing from the spirit and scope of the present invention. Accordingly, the drawings and description that follow are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
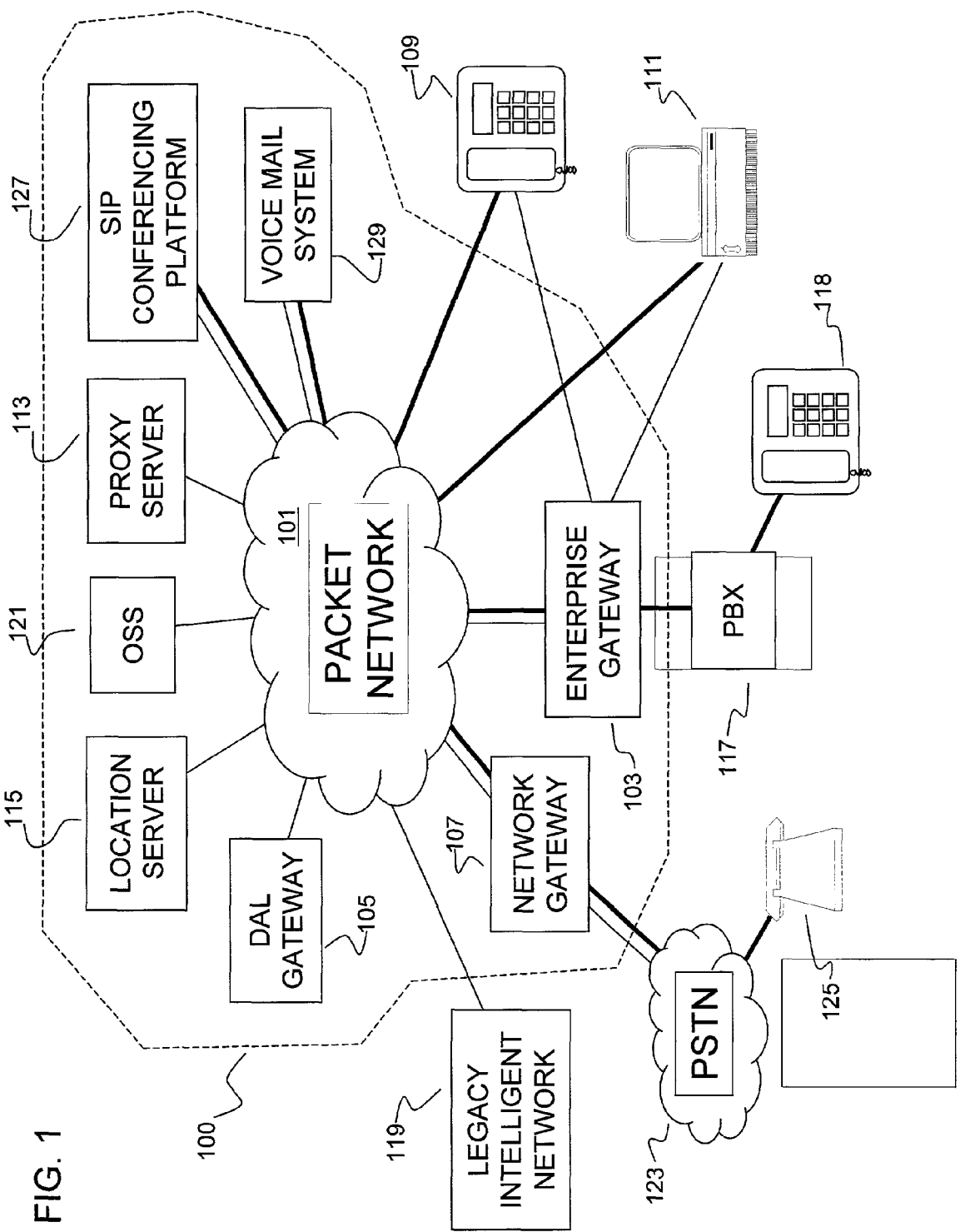
FIG. 1 is a diagram of a data communications system capable of supporting voice services, in accordance with an exemplary embodiment of the present invention.

The proliferation of data transport networks, most notably the Internet, is causing a revolution in telephony and other forms of real-time communication. Businesses that have been accustomed to having telephony traffic and data traffic separately supported over different systems and networks are now moving towards so-called "converged networks" wherein telephone voice traffic and other forms of real-time media are converted into digital form and carried by a packet data network along with other forms of data. Now that the technologies are feasible to support it, voice over data transport offers many advantages in terms of reduced capital and operating costs, resource efficiency and flexibility.

For example, at commercial installations, customer premise equipment investments are substantially reduced as most of the enhanced functions, such as PBX and automatic call distribution functions, may reside in a service provider's network. Various types of gateways allow for sessions to be established even among diverse systems such as IP phones, conventional analog phones and PBXs as well as with networked desktop computers.

To meet the demand for voice over data transport, service providers and network equipment vendors are faced with the challenges of establishing new protocols and standards, recognizing new business models, implementing new services, and designing new equipment in a way that would have been difficult to imagine twenty years ago.

For example, a new generation of end user terminal devices are now replacing the traditional telephones and even the more recent PBX phone sets. These new sets, such as those offered by Cisco Systems Inc. and Pingtel Corporation, may connect directly to a common packet data network, via an Ethernet connection for example, and feature large visual displays to enhance the richness of the user interface. These devices are representative of the telephony use for real-time data communications. Some other types of media sessions enabled by real-time data communications may include video, high quality audio, multi-party conferencing, messaging and collaborative applications. The manner of feature control described herein may be applied to establishing any type of communications session among parties.

For establishing a communications session in a network, new protocols and control architectures have also emerged. It is worth noting that these have been inspired by the migration to a voice over data but are not necessarily limited to such an environment. In some respects the protocols and control architectures described next may be used to establish calls through any form of transport.

Both the ITU H.323 standard and the IETF's Session Initiation Protocol (SIP) are examples of protocols which may be used for establishing a communications session among terminals connected to a network. The SIP protocol is described in IETF document RFC 2543 and its successors. Various architectures have been proposed in conjunction with these protocols with a common theme of having an address resolution function, referred to as a "location server," somewhere in the network to maintain current information on how to reach any destination and to control features on behalf of users.

In the following description, well-known structures and devices may be shown in block diagram form or otherwise summarized in order to avoid unnecessarily obscuring the present invention. For the purposes of explanation, numerous specific details are set forth in order to provide a thorough understanding of the present invention. It should be understood however that the present invention may be practiced in a variety of ways beyond these specific details.

For example, although the present invention is discussed in the context of the Session Initiation Protocol (SIP) and an Internet Protocol (IP)-based network, one of ordinary skill in the art will recognize that the present invention may be generally applicable to other equivalent or analogous communication protocols or communications networks. For example, various forms of packet data transport, such as IP, ATM, frame relay, etc. may be applied without departing from the spirit and scope of the present invention.

It should be understood throughout this disclosure that, although SIP-type messages are shown for convenience, any type of protocol or a mixture of such protocols may be applied in various parts of the overall system. In particular, the routing requests and responses between the proxy server and location server may strictly or loosely conform to SIP or some other standardized protocol, or may be proprietary in nature.

FIG. 1 shows a diagram of a data communications system capable of supporting real-time media services, especially telephony, in accordance with an exemplary embodiment of the present invention. The communication system 100 includes a packet data transport network 101, which in an exemplary embodiment is an Internet Protocol (IP) based network. System 100 provides the ability to establish communications among various terminal equipment coupled thereto, such as telephone 125, PBX phone 118 and SIP phone 109. In practice, there may be thousands or millions of such terminal devices served by one or more systems 100.

As used herein, the term "SIP phone" refers to any client (e.g., a personal computer, a web-appliance, etc.) that is configured to provide SIP phone functionalities. The SIP phones 109 may take the form of standalone devices—e.g., a SIP phone may be designed and configured to function and appear like a Plain Old Telephone Service (POTS) telephone station. A SIP client 111, however, is a software client and may that run, for example, on a conventional personal computer (PC) or laptop computer. From a signaling perspective, these devices 109, 111 may operate quite similarly, with the main differences relating to the user interface. Unless otherwise stated, it is recognized that the functionalities of both the SIP phones 109 and the SIP client 111 are comparable and that the network operates similarly with either type of device.

The system 100 provides a number of elements to support the voice services, including an enterprise gateway 103, a Dedicated Access Line (DAL) gateway 105, a network gateway 107 and SIP conferencing platform 127. In particular, system 100 comprises the important elements of a proxy server 113 (also known as a network server (NS)) and a location server (LS) 115. Location server 115 serves as a repository for end user information to enable address validation, feature status, and real-time subscriber feature configuration. Additionally, LS 115 may store configuration information.

For the purposes of explanation, the capabilities of system 100 are described with respect to large enterprise users. It is noted that the feature/functionality of system 100 may be applicable to a variety of user types and communications needs. System 100 is able to support customers that maintain multiple locations with voice and data requirements.

As shown, enterprise gateway 103 provides connectivity from a PBX 117, which contains trunks or lines often for a single business customer or location (e.g., PBX phones 118). Signaling for calls from PBX 117 into the IP network comprises information which uniquely identifies the customer, trunk group, or carrier. This allows private numbers to be interpreted in their correct context. To interface to PBX 117, enterprise gateway 103 may use Integrated Digital Services Network (ISDN), Circuit Associated Signaling (CAS), or other PBX interfaces (e.g., European Telecommunications Standards Institute (ETSI) PRI, R2).

The Dedicated Access Line (DAL) gateway 105 is employed in system 100 to allow virtual private network (VPN) customers to be able to access their service even from a conventional telephone not served by the VPN.

Through system 100, communications may be established among the voice stations 125 that are serviced through the PSTN 123 and personal computers (e.g., PC 111) that are attached to packet data network 101.

Keeping in mind the similar nature of PC soft clients and standalone IP telephones, it maybe said that four possible scenarios exist with the placement of a voice over IP call: (1) phone-to-phone, (2) phone-to-PC, (3) PC-to-phone, and (4) PC-to-PC. In the first scenario of phone-to-phone call establishment, a call from the phone 125 is switched through PSTN 123 by a switch to the network gateway 107, which forwards the call through the IP backbone network 101. The packetized voice call is then routed through network 101, perhaps to another similar network gateway 107, to be at another PSTN phone (not shown). Under the second scenario, the phone 125 places a call to a PC through a switch to the PSTN 123. This voice call is then switched by the PSTN 123 to the SIP network gateway 107, which forwards the voice call to a PC 111 via the network 101. The third scenario involves a PC 111 that places a call to a voice station (e.g., phone 125). Using a voice encoder, the PC 111 introduces a stream of voice packets into the network 101 that are destined for the SIP network gateway 107. The SIP network gateway 107 converts the packetized voice information into a POTS electrical signal, which is circuit switched to the voice station (e.g., phone 125). Lastly, in the fourth scenario, a PC 111 establishes a voice call with another PC (not shown); in this case, packetized voice data is transmitted from the PC 111 via the network 101 to the other PC (not shown), where the packetized voice data is decoded.

As mentioned, system 100 may employ SIP to exchange session setup messages. Another popular session establishment protocol is referred to as the H.323 protocol, although it is actually a set of related protocols promulgated by the International Telecommunication Union (ITU) for accomplishing multimedia communication. SIP is an alternative standard that has been developed by the Internet Engineering Task Force (IETF). SIP is a signaling protocol that is based on a client-server model, generally meaning that clients invoke required services by messaging requests to servers that can provide the services. Similar to other IETF protocols (e.g., the simple mail transfer protocol (SMTP) and Hypertext Transfer Protocol (HTTP)), SIP is a textual, humanly readable protocol.

It may be noted that neither the H.323 or SIP protocols are limited to IP telephony applications, but have applicability to multimedia services in general. In one embodiment of the present invention, SIP is used to establish telephone calls and other types of sessions through system 100. However, it will be apparent to those of ordinary skill in the art that the H.323 protocol (with some modifications or extensions) or other similar protocols could be utilized instead of SIP. Separate from SIP, but often used in conjunction with SIP, is the Session Description Protocol (SDP), which provides information about media streams in the multimedia sessions to permit the recipients of the session description to participate in the session.

The Internet Engineering Task Force's SIP protocol defines numerous types of requests, which are also referred to as methods. An important method is the INVITE method, which invites a user to a conference. Another method is the BYE request, which indicates that the call may be released. In other words, BYE terminates a connection between two users or parties in a conference. Another method is the OPTIONS method. This method solicits information about capabilities without necessarily establishing a call. The REGISTER method may used to provide information to a SIP server about a user's present location.

Details regarding SIP and its call control services are described in IETF RFC 2543 and IETF Internet Draft "SIP Call Control Services", Jun. 17, 1999; both of these documents are incorporated herein by reference in their entireties.

Transmission of SIP messages can take place in an IP network through the well known User Datagram Protocol (UDP) or through the more reliable Transaction Control Protocol (TCP). Whereas SIP, H.323, or other protocols may be used to establish sessions through a data network, the actual media or "traffic" that is to be communicated among users may take place according to the well known Real-time Transport Protocol (RTP) as described in the IETF document RFC 1889.

It is likely, though not essential, that all of the call control signaling (SIP, H.323), media traffic (RTP/RTCP) and network management and provisioning will be communicated through common transport network 101. Thus, in FIG. 1, all of the elements appear in a hub arrangement around transport network 101.

In the traditional telephone network, calls are directed to specific locations or terminal devices uniquely identified by the called telephone number. In contrast, system 100 enables the caller to specify a called party to be reached independent of any particular location or terminal.

The user may move from one terminal to another and, at each terminal, may register as being present so that inbound calls are directed to the most recently registered location. Furthermore, a user may have both personal and group-wise profile settings that affect the activation of features, such as call blocking, even as a function of the time of day.

Because of the dynamic nature of user location and of call handling features, each request to establish a session is first routed to a proxy server so that user permissions may be verified, destination addresses may be found, and special features related to a user or a business may be applied to the call. Requests are serviced internally or by passing them on, possibly after translation, to other servers. A proxy interprets, and, if necessary, rewrites a request message before forwarding it.

In general, location server 115 accepts a routing request, such as from a proxy server, and determines addresses or "contacts" corresponding to the destination party expressed in the routing request. In response to the request, the location server may return a redirect response comprising contact information for the party. It is noted that messaging between NS 113 and LS 115 may use a modified version of SIP. For example, SIP acknowledge messages may be unnecessary between NS 113 and LS 115. Otherwise, messaging among network functions, such as NS 113 and LS 115, may use standard SIP or even non-SIP alternatives.

System 100 further includes an Operational Support Systems (OSS) 121 to provide provisioning, billing, and network management capabilities. OSS 121 may provide an environment or an interface, such as a web-based interface, for provisioning many aspects of dialing plans, user permissions and how features operate on behalf of each user. Many of these aspects are configured via OSS 121 by changing information within location servers or databases within system 100. Some specific features that may be configured by OSS 121 include legacy Centrex features such as Unconditional Call Forwarding, Conditional Call Forwarding, Call Blocking and Call Screening.

A user accessing OSS 121 a web interface may readily change service options by altering values in a user profile maintained within system 100. Consequently, by changing values in user profile or screening tables as described in FIG. 3 herein, a user may activate or alter the behavior of the call forwarding on screening feature provided by the present invention. A user may also have some ability alter such settings directly from a phone, especially through one of the newer IP telephone units offering a display and a rich user interface. In either manner of accessing and altering the forwarding settings in the profile, the user does not involve any manual effort by the service provider. Changes may be made by the user as frequently as desired and take effect immediately.

Another feature that may be configured involves the so-called "Find-Me" service. A Find-Me schedule provides a mechanism to route calls using a list of possible destinations, wherein each destination is tried in turn. A Find-Me list may be specified to apply during a time-of-day or day-of-week or may be associated with different categories of calling numbers. Furthermore, a default Find-Me list might be provisioned to determine general handling when the more specific Find-Me lists are not in effect.

SIP phones 109 allow users to register and de-register, or login and logout, from the phone. In an exemplary embodiment, to provide mobility, SIP phones 109 permit usernames and passwords to be entered for visitors. Logging in allows the SIP phone to assume the profile of the visitor. By logging in, incoming calls to the visitor's profile are directed to the phone. When a visitor logs in, SIP phones 109 register the visitor with the Network Server 113 and Location Server 115. Any incoming call to any of the profiles registered by the phone can be directed to the phone. Network Server 113 and Location Server 115 may respond similarly to both situations where a user is logged in as a visitor or where the user is logged in to their usual home device, if there is one. The Network Server 113 and Location Server 115 logic may rely upon the user name delivered as a result of the proxy authorization challenge.

With respect to E.164 and DNS addressing, SIP phones 109 may support ENUM (Electronic Number) service, which is be used to route calls that originate in the IP domain or with ENUM-enabled networks. ENUM service is detailed in IETF RFC 2916, entitled "ENUM", which is incorporated herein by reference in its entirety. The SIP phones 109 may also support LINCP for client-based directory lookup.

A "Do Not Disturb" feature may be available at a terminal so that incoming calls are declined and, in the case of telephones and pagers for example, no ringing occurs to disturb users nearby. When "Do Not Disturb" is invoked on a SIP phone 109, the SIP phone 109 returns a Busy message if contacted by NS 113. For example, the phone returns a busy signal instead of ringing when an incoming call arrives. When the SIP phone 109 returns a "486 Busy" message, the Network Server 113 and Location Server 115 can make intelligent routing decisions based on a user profile, such as whether a Call Forwarding On Busy feature has been provisioned.

Figure 2:
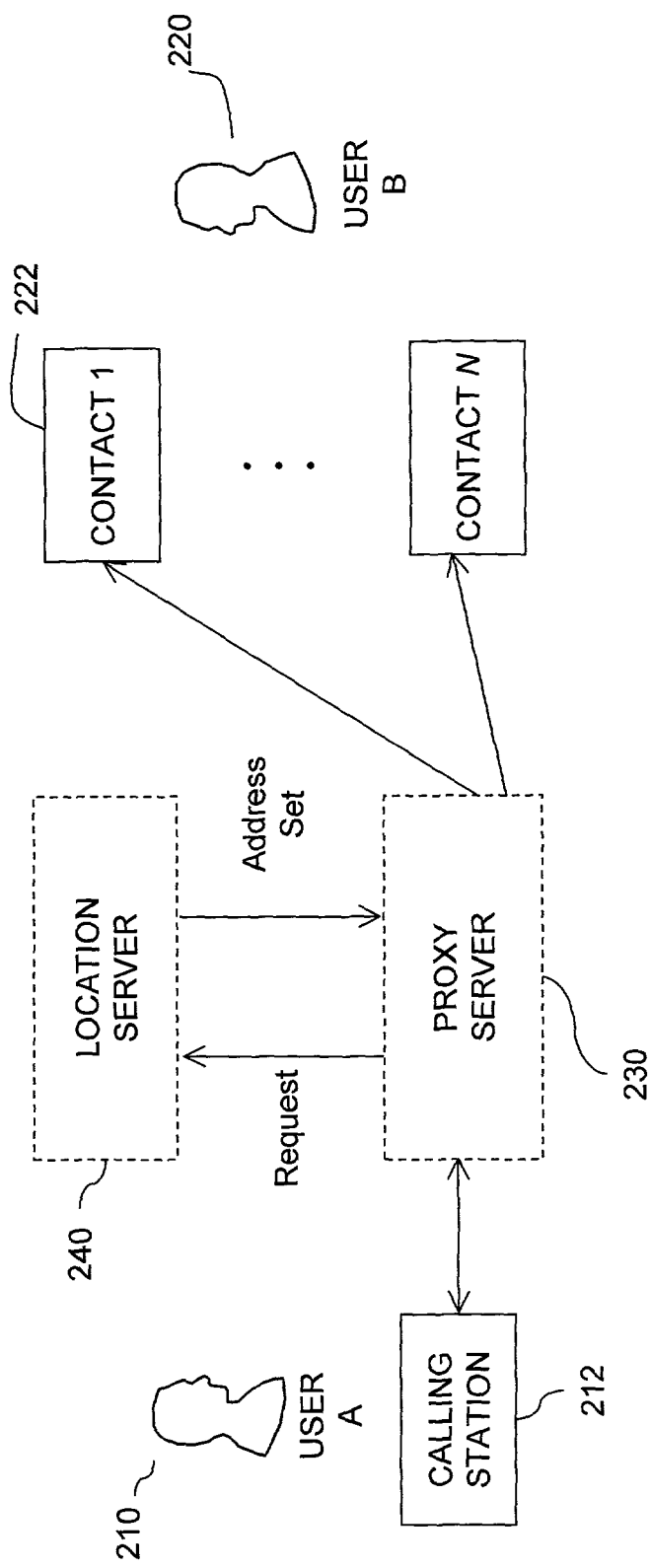
FIG. 2 is a diagram of functional elements involved in establishing a session among parties according to an exemplary embodiment of the present invention.

FIG. 2 is a diagram depicting the typical interaction of basic elements according to the prior art to perform a session setup by using the SIP protocol. Communications among these elements will typically take place through a common packet data network such as IP network 101 in FIG. 1.

Briefly, a session is initiated in the following manner: The proxy server first receives a request, such as a SIP "INVITE" message, typically from a calling station where a first user desires to contact a second user. The second user may be identified by telephone number, IP address, or uniform resource locator (URL), for example. The proxy server may then relay a routing request to the location server for such purposes as verifying the privileges of the first user to reach the second user, finding one or more locations for the second user and performing any call handling features provisioned for the first or second users. Generally, the location server responds to the proxy's request by returning to the proxy server one or more addresses of terminals where the second user may be contacted.

In FIG. 2, User A 210 desires to establish communications with User B 220. User B 220 may be reachable at any one of several addresses. These addresses or contacts may correspond to conventional telephones, IP phones, wireless phones, pages, etc. The list of addresses may even be changing as User B moves about and registers as being present at various terminal devices 222. The current information about User B's contact information is typically maintained in location server 240 or in a presence registry of some type not shown here.

To initiate contact, User A 210 accesses a terminal, calling station 212, and specifies User B as the destination to be reached. This expression of the specific desired destination may take the form of dialing of digits or of selecting a user name or URL-style address from a list. In some cases, User A may also be able to express what type of session is desired (video, high quality, messaging, etc.) or specify a desired quality level for the session Once the request is specified at station 212, a SIP "INVITE" message describing the request is composed and sent to proxy server 230.

Proxy server 230 typically forwards a request to location server 240 to retrieve one or more contacts at which User B might be reached. As described earlier, proxy server 230 consults location server 240 for a variety of purposes, such as invoking profile-controlled feature behavior and obtaining the latest known location information pertaining to User B.

Location server 240 analyzes the request and responds to proxy server 230 in one of several possible ways. Location server 240 may disallow the session if User A is not permitted to contact User B, if User B's address cannot be recognized, or if User B has a feature activated that renders User B unreachable by User A. Location server 240 may respond to proxy server 230 that User A must authenticate themselves to the system before the session can be established.

Location server 240 may determine that User A is allowed to contact User B and may even find multiple addresses at which User B may be reachable. If this is the case, location server 240 returns a SIP "300 Multiple Choices" message containing a list of the contacts to be tried.

Upon receiving such a response, proxy server 230 then commences trying the contacts to see if User B can successfully be reached at any of the corresponding terminals 222. This "Find-Me" functionality is usually carried out in sequence starting with the most recent registered location or following a specific order as provisioned for User B (phone then pager). In some configurations, it is conceivable that proxy server 230 may attempt all contacts in parallel. An attempt to establish contact with a terminal 222 involves sending a SIP "INVITE" to the terminal and waiting for a reply indicative of success or failure.

FIG. 2 depicts a typical mode of operation situation wherein the location server performs feature processing and returns to the proxy, NS1, a resulting set of contacts for the destination party being sought. The performance of screening, processing of special features and determination of possible contacts for the called party depends on user profile information maintained in the communication system and provisioned by OSS 121 or other means.

Figure 3:
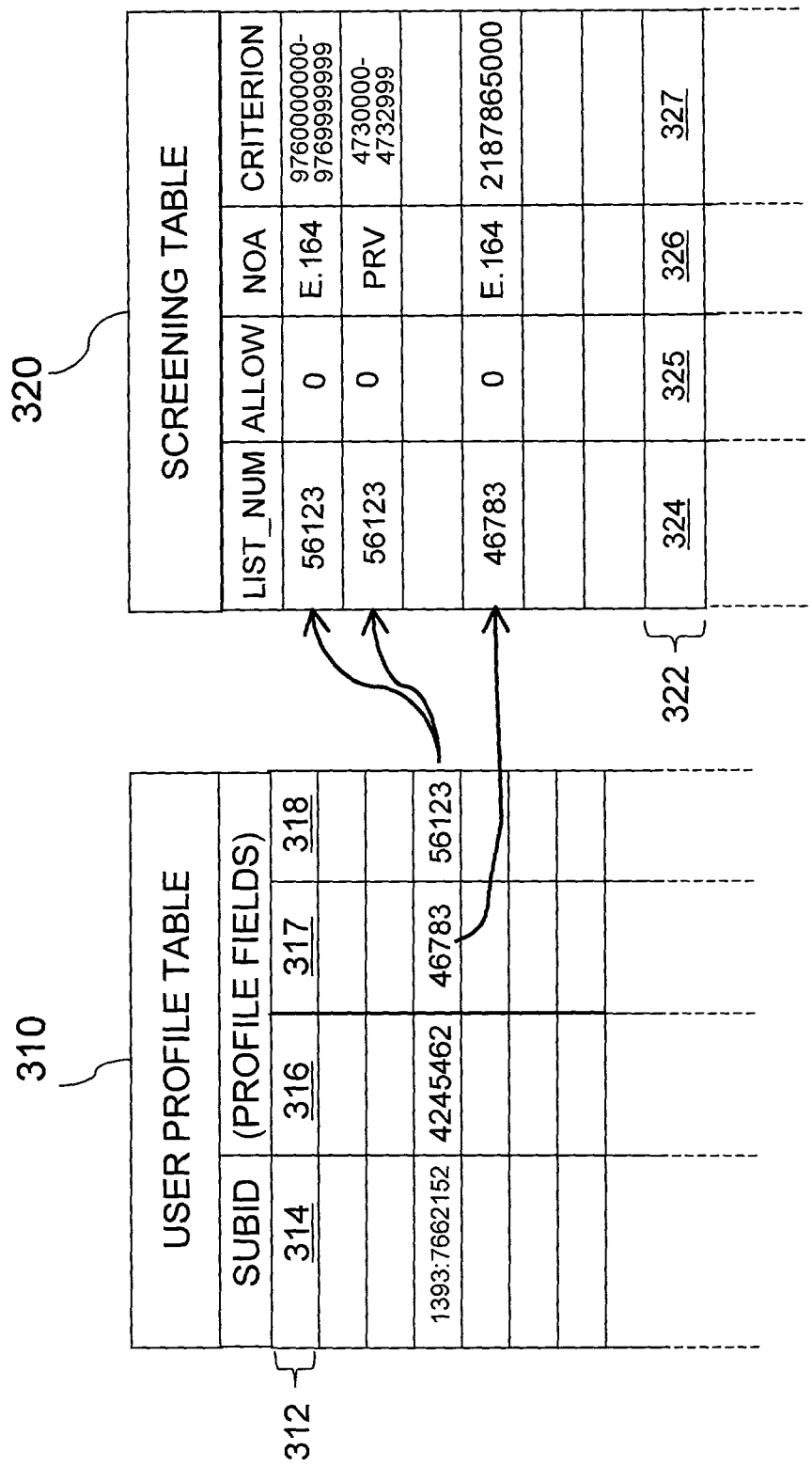
FIG. 3 is a diagram of data structures useful for implementing feature blocking in accordance with an exemplary embodiment of the present invention.

With respect to user profile information, FIG. 3 depicts a pair of data structures which may be used to implement the present invention when populated in a manner that will now be described.

User Profile Table 310 is shown to comprise user profile records 312. Each user profile record provides a set of values that control service processing. Various ones of these values may be set by provisioning activities through OSS 121 or may be user-configurable through a web-based interface or a SIP phone, for example. Some values may provide indices to yet other tables, such as a listing of currently registered locations for the user.

Each record in User Profile Table 310 represents a unique user profile within system 100, and generally corresponds to an individual user. The SUBIDs in User Profile Table 310 are unique. As those of ordinary skill in the art will appreciate, a SUBID may be derived from, for example, the combination of a unique dial plan identifier along with a listing identifier that is unique within that dial plan.

A dialing plan ID is a function of a particular enterprise customer having a VPN with its own dialing plan. The dialing plan ID ensures that multiple VPNs can coexist and be adequately differentiated in system 100. For example, an originator dialing extension "2665205" in a private network belonging to Company A should reach the intended destination within Company A, even if Company B sharing the same system 100 happens to also have a "2665205" location in its private numbering plan.

In the example of FIG. 3, each record 312 in User Profile Table 310 is shown to comprise profile fields 316, 317 and 318 which may each have values that control different aspects of service processing. For example, the value in field 318 for each record may affect originating call screening or "OCS", meaning the permissions for the user to originate calls. The value in field 317 may affect terminating call screening or "TCS", meaning calls that the user may accept from others. A CFOS contact field 316 may contain a forwarding contact address for call-forwarding-on-screening. The lack of any value in field 316 may signify that call-forwarding-on-screening is not active for the given user profile record.

A Screening Table 320 is also shown comprising screening criteria records 322. Each record 322 is shown to comprise several fields, including a LIST_NUM field 324, an ALLOW field 325, a Nature-of-Address field 326 and a criteria field 327. Each record in Screening Table 320 describes outbound origination and inbound termination permissions in the communications system. The LIST_NUM field 324, when populated, identifies one or more related records in table 320. The criteria field 327 expresses a particular value (such as an IP address) or a range of values (telephone numbers within a certain range) for comparison to numbers being screened. Nature of Address (NOA) field 326 expresses the types of addresses to which the record pertains. Naturally, a given criteria expressed in the field is only meaningful in the context of a particular address type, such as an IP address, E.164-type telephone number or a private number.

The ALLOW field 325 conveys the sense in which the record is to be interpreted. With one value in the ALLOW field, a record may express that any numbers (telephone numbers or IP addresses) which fulfill the criteria set forth in criteria field 327 are to be disallowed. With another value in this field, the record may be interpreted such that numbers in the criteria field are the only numbers that may be allowed. Note that the type of screening that criteria is applied to is not a function of record 322 itself, but rather which of the fields 317 or 318 contained the "pointer" to record 322.

Tables 310 and 320 are maintained by, or are accessible to, a location server 115 for supporting real-time feature processing in system 100. In the course of handling a session request in system 100, location server 115 will consult the user profile table to determine how to act upon the request based upon user settings in the table.

A record in table 310 may have fields that reference specific records in other tables. In particular, OCS field 318 may contain a value that corresponds to one or more records in screening table 320. For example, as shown in FIG. 3, the fourth record in table 310 has a value in the OCS field corresponding to two separate records 322 in table 320. The same record in table 310 also has a value in the TCS field 317 referencing yet another record, for a different purpose, in table 320. For efficiency in locating records, it is conceivable that the records in screening table 320 may be sorted in order of LIST_NUM values or that a hash table of some kind may be used.

A single instance of screening table 320 may hold records affecting all forms of screening, such as OCS and TCS. The uniqueness of values in the LIST_NUM field, as well as careful entry of values in fields 317 and 318 ensures that OCS and TCS records may coexist in table 320 without confusion. Alternatively, another field might identify each type of record or separate tables might be used for supporting OCS, TCS and any other screening functions separately. As those of ordinary skill in the art will appreciate, many variations are possible and various performance parameters, such as throughput and the ease of updating table values, will drive the design of a working implementation.

Figure 4:
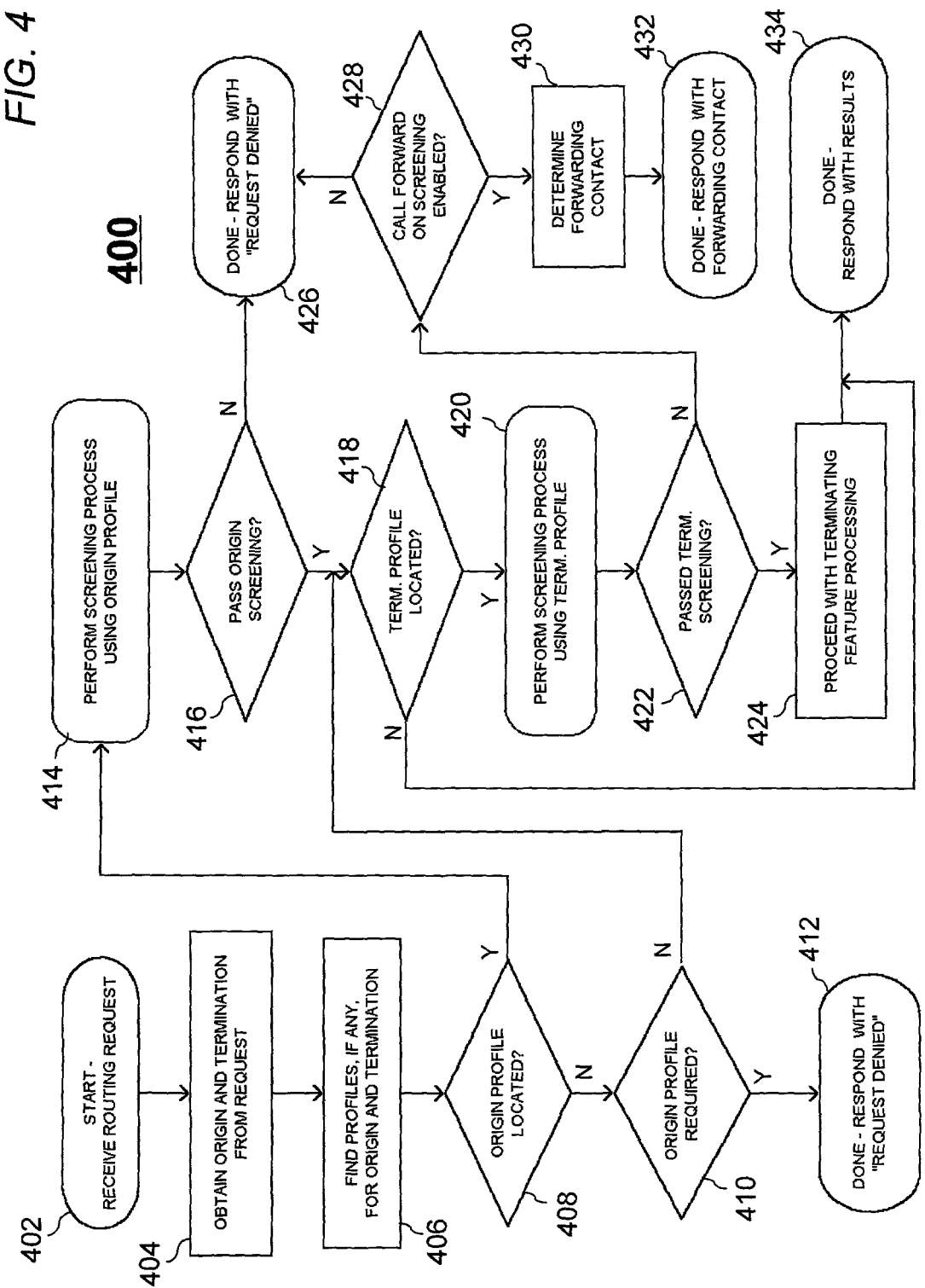
FIG. 4 is a flowchart of a process for handling a routing request and implementing a call forwarding on screening feature in accordance with an exemplary embodiment of the present invention.

FIG. 4 shows a process 400 for handling session requests, including novel provisions for performing call forwarding on screening. Process 400 may be performed within location server 115, for example. Process 400 commences in step 402 upon the receipt of a routing request from a proxy server or the like. The routing request is submitted to the location server, perhaps in response to a session request initiated by an originating user.

In step 404, the routing request is interpreted or parsed to identify the origin of the call and the intended destination party or termination for the call.

In step 406, user profiles, if any, for both the origin and termination are obtained from a database of some sort accessible to the location server. As mentioned before, a principle role of the location server is to retrieve and apply information about users that affects service processing. Part of the information available from such profiles describes outbound calling permissions for the originating party and acceptable inbound calls for the terminating party. In the context of a particular routing request received in step 402, both of these factors affect whether or not the session request is permissible. Step 406 further entails applying these originating and terminating screening criteria.

In step 408, it is determined whether a user profile associated with the originating party exists and is accessible to a location server which may be executing process 400. If not, then execution continues with step 410, wherein it is determined whether an originating profile is necessary to allow a session to be permitted among the originating and terminating parties. In some cases, the lack of a user profile for an originating party signifies that the originator is unknown to the system and it may be desirable to decline session requests from the unknown originator. In other cases, the acceptance of the originator's request may depend upon other factors, such as which proxy server or gateway the routing request came from or perhaps other factors as expressed in the terminating user's profile.

If the subject communications system is configured such that the lack of a user profile for the originator is unacceptable, the process 400 proceeds to step 412 wherein a "request denied" response of some nature is sent back to the proxy server that submitted the routing request in step 402.

To address the alternative determinations in steps 408 and 410, if user profile for the originating party is located in step 408, then execution proceeds to step 414 to perform origination screening. If, in step 408 no originating user profile is found, yet in step 410 it is determined that no user profile is required, then execution bypasses the originating screening of step 414 and instead proceeds to perform terminating screening in step 420.

Step 414 involves originating screening, that is, ensuring that the originator has permission to establish a session as requested. An originating screening process represented by this step will be described in greater detail in conjunction with FIG. 5.

After the originating screening processing of step 414, decision step 416 is performed. In step 416, the result of the originating screening is evaluated and, if the call fails to pass such screening, execution proceeds to step 426 wherein a denial response is returned to the proxy in answer to the routing request that was received in step 402.

Otherwise if, in step 416, it is determined that the routing request passes origination screening, then, in step 418, it is further determined whether the terminating profile is available, as may have already been discovered earlier in step 406. If the terminating profile is not accessible, then no features are specified for the terminating user. Consequently, because there is no need for feature processing nor are there any per-user call-forwarding-on-screening settings, the processing moves to step 434 to provide contact information without involving feature invocation and to convey this information as response back to the proxy in step 434.

Returning to step 418, if it is determined that a user profile for the terminating party is available, step 420 is executed to perform terminating call screening based upon the terminating user profile. A terminating screening process represented by this step will be described in greater detail in conjunction with FIG. 6.

If the routing request passes terminating screening of step 420, the decision step 422 allows execution to proceed with step 424 to apply any applicable feature processing based upon the profile. For example, the terminating user's profile may indicate that a "find-me" feature is enabled and may provide a list of contacts to be tried. In accordance with the prior art, this list of contacts will normally be returned to the proxy so that the proxy may then try to reach the terminating party using these contacts.

Of course, there are a wide variety of possible features that might be implemented. The general manner in which these features are processed are well known and need not be explained to enable one of ordinary skill in the art to apply the present teachings. Furthermore, the specific manner in which such features processing might be implemented are subject to many implementation-specific details, preferences and arbitrary design choices, all of which have little bearing upon the operation of the present invention.

After any applicable feature processing is performed in step 424, the resulting response, which may comprise a list of contacts at which to reach the terminating party, is returned to the proxy in step 434 to conclude process 400.

Returning to step 422, if the routing request fails to pass terminating screening, execution is diverted to step 428. In step 428, it is determined whether call-forwarding-on-screening is enabled. This may be signified, for example, by the presence of forwarding instructions or referral contacts in the terminating user's profile, such as in field 316 of a record in table 310. It is also possible that this feature might be implemented as a policy on an organizational basis, but even so, this may be implemented by appropriate settings in users' profiles. This may be easily done, for example, by inserting particular values in fields 316, 317 and 318 of all the applicable user records. This value may be a default that is entered each time a new user profile record is created. Alternatively, other logic may be applied to screening each call based on settings in a organizational profile that supercedes or establishes default settings for individual user records.

In step 428, if no call-forwarding-on-screening settings are evident, then the normal handling similar to the prior art is accomplished by branching to step 426, wherein a "request denied" indication of some type is returned to the proxy. This will generally result in the calling party receiving a busy signal or the like.

Alternatively, if, in step 428, call-forwarding-on-screening settings are evident, then, in accordance with the present invention, execution proceeds with step 430 to determine an appropriate forwarding contact in response to the screening failure. This forwarding contact is returned to the proxy ions step 432 in response to the routing request that was received in step 402. Process 400 is thereby concluded.

Figure 5:
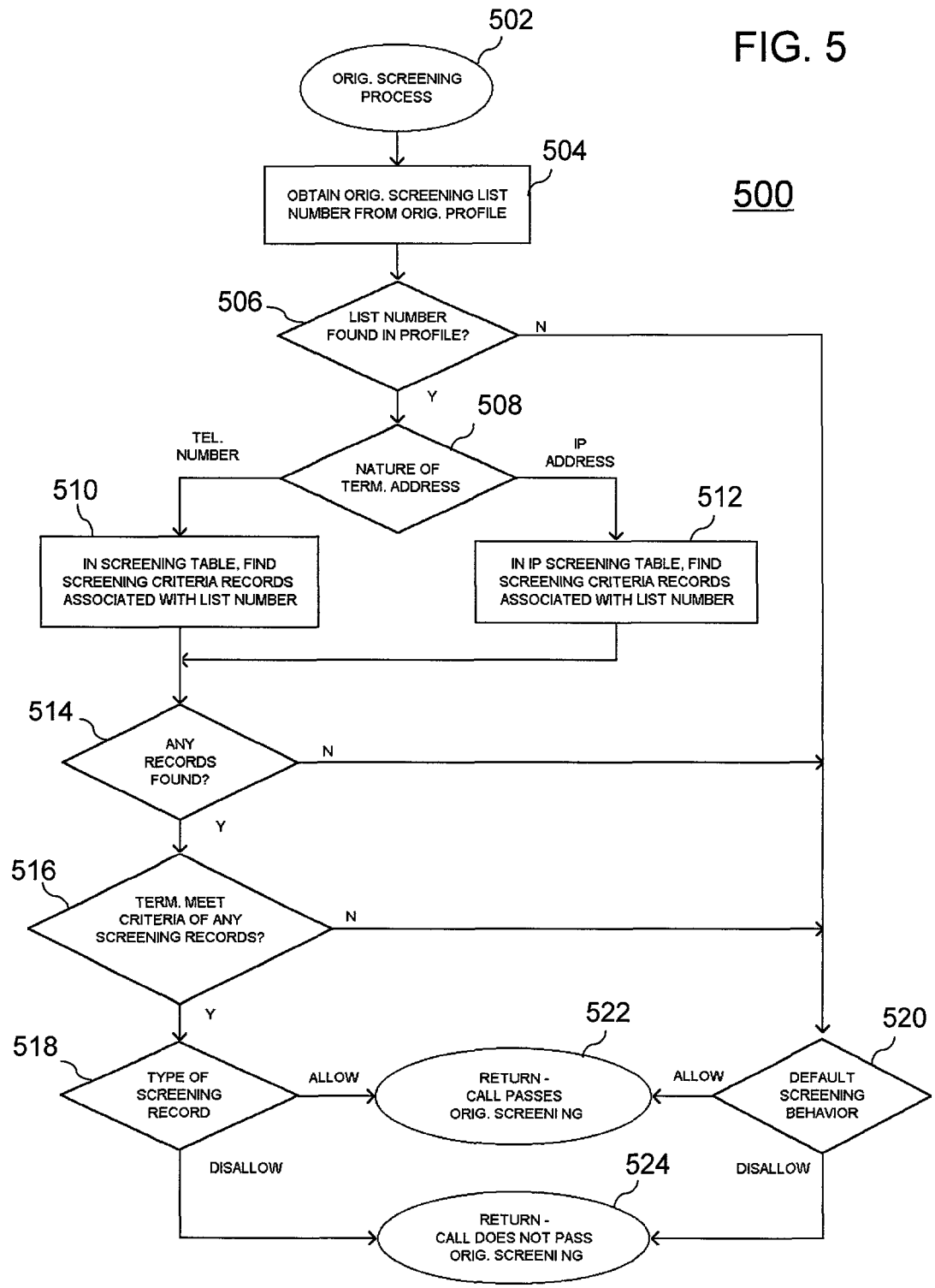
FIG. 5 is a flowchart of a process for performing originating screening in accordance with an exemplary embodiment of the present invention.

FIG. 5 provides further description of how the originating screening of step 414 may be implemented. Process 500 comprises a sequence of steps for applying configurable screening criteria to a particular call or session request. In particular, process 500 applies to checking originating requests against screening criteria expressed in the originating user's profile along with a screening table. Process 500 may be viewed as a subroutine or callable function with a binary return value represented by the execution of either step 522, indicating that a contact passes screening, or of step 524, indicating the contrary.

Process 500 commences in step 502 when a routing request from the originator is to be tested against origination screening criteria associated with the originating user's profile.

In step 504, a "list number" is obtained from the originating user's profile. For example, referring briefly to FIG. 3, a record 312 in User Profile Table 310 may have an OCS field 318 that determines how originating screening criteria may be obtained from screening table 320. Step 504 relates to obtaining the value in field 318 to be used as a record locator in screening table 320. The list number value so obtained will be compared to values in the LIST-NUM field 324 of screening table 320 in order to find applicable criteria records.

In step 506, it is determined whether a list number for origination screening, such as field 318 in record 312, was actually found. In many cases, a given user will not have any origination screening configured and this field may be non-existent or contain a null or zero value to represent the lack of that feature. If this is the case, then decision step 506 causes execution to pass to decision step 520, wherein the default screening behavior is assumed. It is foreseeable that the default behavior might be to allow all calls where origination screening is not applicable. It is also conceivable to have a system that defaults to disallowing all calls unless an origination screening criteria is clearly met. Depending on the default screening criteria configured for the user or system, the outcome of screening process 500 may then be to either execute step 522, indicating that the contact passes originating screening, or to execute step 524, returning an indication that the contact does not pass originating screening.

Returning to step 506, if a list number for origination screening is located, then execution proceeds to step 508 wherein the type of address for the termination is used to differentiate among two different screening tables, one for private or public telephone numbers and the other for IP addresses. The difference in the tables could be the manner in which criteria, such as ranges of values, are expressed.

The "nature-of-address" is an attribute referring to the differences in format and significance between an IP address, an E.164 type telephone number having significance in the public telephone network, and a private (VPN) telephone number. Although two separate tables are described by way of example to accommodate IP addresses and telephone numbers, those of ordinary skill in the art will appreciate that many other arrangements are possible. For example, it is possible to have yet other tables relating to other address types, perhaps to accommodate new types yet to be developed. It is also conceivable to develop a scheme for various address types to coexist in the same data structure despite the differences in how criteria, such as ranges of addresses, might be specified for each address types.

If, in step 508, the nature of the contact address is determined to be a public or private telephone number, then execution continues with step 510 to use a screening table, as exemplified by screening table 320, to locate criteria records having a LIST_NUM value that matches the list number derived from the profile in step 504. In finding such records, the nature of address determined for the contact in step 508 is also used to select only those criteria records having a matching NOA field 326. This ensures, for example, that an E.164 contact is compared to E.164 criteria and not to any private number criteria that may also be configured for the terminating user.

Alternatively, if, in step 508, the nature of the contact address is determined to be an IP address, then execution continues with step 512 to use a different screening table, analogous to screening table 320 but perhaps suited for specifying IP addresses, or ranges thereof. As with step 510, criteria records are located having a LIST_NUM value that matches the list number derived from the profile in step 504.

Regardless of whether step 510 is performed or step 512 is performed, execution then proceeds to step 514 to branch based upon whether or not any criteria records have been found in the appropriate screening table. If not, then execution proceeds to step 520 to invoke default behavior as described earlier.

Otherwise, if criteria records have been found, then execution continues at step 516 to evaluate whether the specific contact address meets any of the criteria expressed by the records. An example might be to find if an E.164 number "3129756483" provided as the requested termination falls within the range of "3129750000-3129759999" specified in criteria field 327 of a record 322 within screening table 320.

If the contact does not satisfy any of the criteria set forth in criteria records, then decision step 516 causes execution to resume with step 520 to cause default screening behavior as described earlier.

On the other hand, if, in step 516, the contact meets any of the criteria expressed in the criteria records, then execution proceeds with step 518 to determine the sense in which the criteria is to be applied. For example, by referring to the ALLOW field 325 of a record 322, it is determined whether the criteria being met signifies that the contact is permissible or is not.

In one sense, perhaps if the ALLOW field contains a '0', the fact that the contact meets the criteria expressed in the record may mean that the contact is permissible, whereas the lack of any matching records might signify that the contact is impermissible. The criteria record would, in effect, specify the only contacts allowed and exclude all others. In the opposite sense, if the ALLOW field contains a '1', the contact having met the criteria may mean that the contact is to be disqualified.

In one embodiment, the criteria of screening records may be configured in observance of a policy that none of the criteria ranges should overlap. This approach is advantageous in that a given contact may only satisfy, at most, one criteria record. Once that record has been located, none of the remaining records need to be evaluated with respect to the contact. Another advantage with ensuring that only a single criteria record applies to a given contact is that the screening sense of the record, as indicated by ALLOW field 325, suffices to unambiguously convey the disposition of the contact. Otherwise, without some additional logic, having overlapping criteria with differing ALLOW field values creates the possibility of conflicting screening determinations.

Those of ordinary skill in the art will appreciate that there may be alternative ways to process criteria records even if criteria are allowed to overlap, such as establishing some precedence for considering the net effect of all of the criteria that the contact satisfies.

If, in step 518, the sense of the screening record is determined to be to allow calls that meet the criteria, then step 522 is executed to conclude process 500 and return an indication that the call has passed originating screening. Otherwise, if the sense of the screening record is such that calls that meet the criteria are to be blocked, then step 524 is executed to indicate the call does not pass screening.

Figure 6:
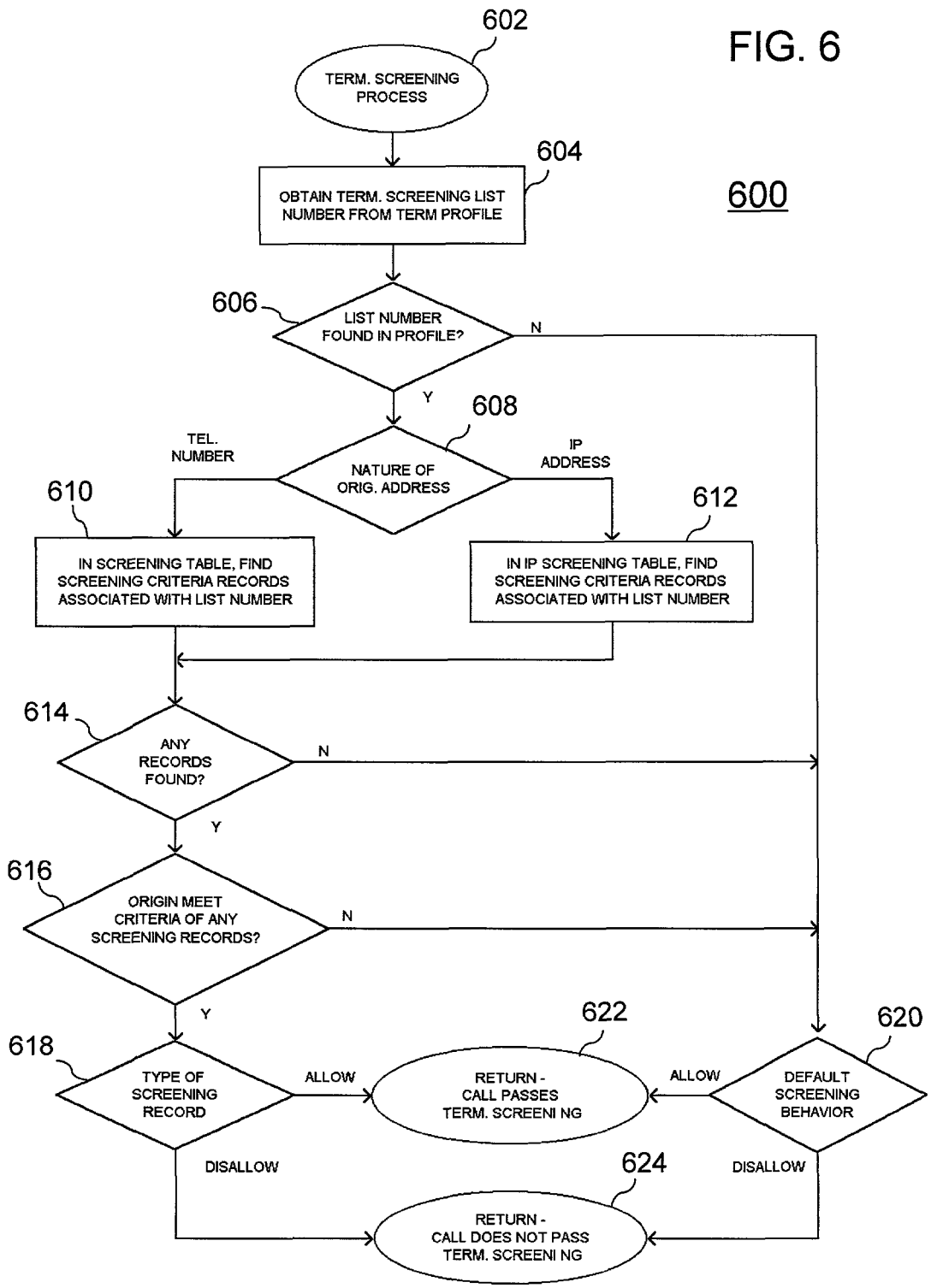
FIG. 6 is a flowchart of a process for performing terminating screening in accordance with an exemplary embodiment of the present invention.

FIG. 6 provides further description of how the terminating screening of step 724 may be implemented. Process 600 comprises a sequence of steps for applying configurable screening criteria to a particular call or session request. In particular, process 600 applies to checking whether the originator may be a party that has been designated as blocked according to a screening criteria expressed in the terminating user's profile coupled with a screening table. Process 600 may be viewed as a subroutine or callable function with a binary return value represented by the execution of either step 622, indicating that a call from a given origination passes screening, or of step 624, indicating the contrary.

Process 600 commences in step 602 when the originating address or identifier is to be tested against terminating screening criteria associated with the terminating user's profile.

In step 604, a "list number" is obtained from the terminating user's profile. For example, referring briefly to FIG. 3, a record 312 in User Profile Table 310 may have a TCS field 317 that determines how terminating screening criteria may be obtained from screening table 320. Step 604 relates to obtaining the value in field 317 to be used as a record locator in screening table 320. The list number value so obtained will be compared to values in the LIST-NUM field 324 of screening table 320 in order to find applicable criteria records.

In step 606, it is determined whether a list number for terminating screening, such as field 317 in record 312, was actually found. In many cases, a given user will not have any terminating screening configured and this field may be non-existent or contain a null or zero value to represent the lack of that feature. If this is the case, then decision step 606 causes execution to pass to decision step 620, wherein the default screening behavior is assumed. It is foreseeable that the default behavior might be to allow all calls where terminating screening is not applicable. It is also conceivable to have a system that defaults to disallowing all calls unless a terminating screening criterion is clearly met. Depending on the default screening criteria configured for the user or system, the outcome of screening process 600 may then be to either execute step 622, indicating that the call passes terminating screening, or to execute step 624, returning an indication that the call does not pass terminating screening.

Returning to step 606, if a list number for terminating screening is located, then execution proceeds to step 608 wherein the type of address of the contact is used to differentiate among two different screening tables, one for private or public telephone numbers and the other for IP addresses. The difference in the tables could be the manner in which criteria, such as ranges of values, are expressed.

If, in step 608, the nature of the contact address is determined to be a public or private telephone number, then execution continues with step 610 to use a screening table, as exemplified by screening table 320, to locate criteria records having a LIST_NUM value that matches the list number derived from the profile in step 604. In finding such records, the nature of address determined for the contact in step 608 is also used to select only those criteria records having a matching NOA field 326. This ensures, for example, that an E.164 contact is compared to E.164 criteria and not to any private number criteria that may also be configured for the terminating user.

Alternatively, if, in step 608, the nature of the contact address is determined to be an IP address, then execution continues with step 612 to use a different screening table, analogous to screening table 320 but perhaps better suited for specifying IP addresses, or ranges thereof. As with step 610, criteria records are located having a LIST_NUM value that matches the list number derived from the profile in step 604.

Regardless of whether step 610 is performed or step 612 is performed, execution then proceeds to step 614 to branch based upon whether or not any criteria records have been found in the appropriate screening table. If not, then execution proceeds to step 620 to invoke default behavior as described earlier.

Otherwise, if criteria records have been found, then execution continues at step 616 to evaluate whether the specific contact address meets any of the criteria expressed by the records. An example might be to find if an E.164 number "3129756483" specified as the originator falls within the range of "3129750000-3129759999" specified in criteria field 327 of a record 322 within screening table 320.

If the contact does not satisfy any of the criteria set forth in criteria records, then decision step 616 causes execution to resume with step 620 to cause default screening behavior as described earlier.

On the other hand, if, in step 616, the contact does meet any of the criteria expressed in the criteria records, then execution proceeds with step 618 to determine the sense in which the criteria is to be applied. For example, by referring to the ALLOW field 325 of a record 322, it is determined whether the criteria being met signifies that the contact is permissible or is not.

If, in step 618, the sense of the screening record is determined to be to allow calls that meet the criteria, then step 622 is executed to conclude process 600 and return an indication that the call has passed terminating screening. Otherwise, if the sense of the screening record is such that calls that meet the criteria are to be blocked, then step 624 is executed to indicate the call does not pass screening.

Figure 7:
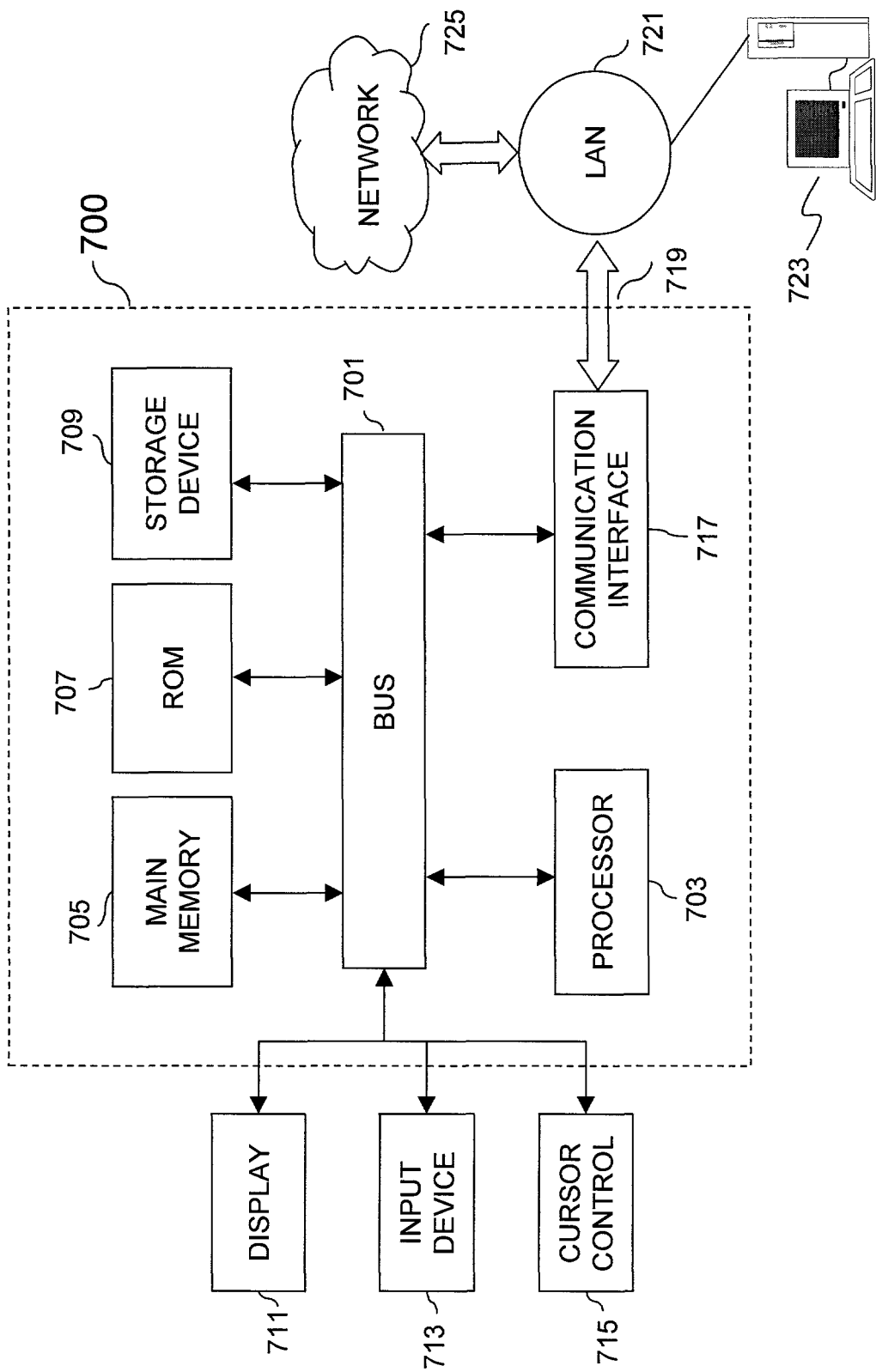
FIG. 7 is a diagram of a computer system which may serve as an embodiment of the present invention.

FIG. 7 illustrates a computer system 700 within which an embodiment according to the present invention can be implemented. The computer system 700 includes a bus 701 or other communication mechanism for communicating information, and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions to be executed by the processor 703. The computer system 700 further includes a read only memory (ROM) 707 or other static storage device coupled to the bus 701 for storing static information and instructions for the processor 703. A storage device 709, such as a magnetic disk or optical disk, is additionally coupled to the bus 701 for storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is cursor control 715, such as a mouse, a trackball, or cursor direction keys for communicating direction information and command selections to the processor 703 and for controlling cursor movement on the display 711.

According to one embodiment of the invention, the SIP server functionalities are provided by the computer system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the present invention. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, or a telephone modem to provide a data communication connection to a corresponding type of telephone line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although only a single communication interface 717 is shown, it is recognized that multiple communication interfaces may be employed to communicate with different networks and devices.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by service provider. The local network 721 and network 725 both use electrical, electromagnetic, or optical signals to convey information and instructions. The signals through the various networks and the signals on network link 719 and through communication interface 717, which communicate digital data with computer system 700, are exemplary forms of carrier waves bearing the information and instructions.

The computer system 700 can send messages and receive data, including program code, through the networks, network link 719, and communication interface 717. In the Internet example, a server (not shown) might transmit requested code belonging an application program for implementing an embodiment of the present invention through the network 725, local network 721 and communication interface 717. The processor 704 may execute the transmitted code while being received and/or store the code in storage device 79, or other non-volatile storage for later execution. In this manner, computer system 700 may obtain application code in the form of a carrier wave.

The term "computer-readable medium" as used herein refers to any medium that participates in providing instructions to the processor 704 for execution. Such a medium may take many forms, including but not limited to non-volatile media, volatile media, and transmission media. Non-volatile media include, for example, optical or magnetic disks, such as storage device 709. Volatile media include dynamic memory, such as main memory 705. Transmission media include coaxial cables, copper wire and fiber optics, including the wires that comprise bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 8:
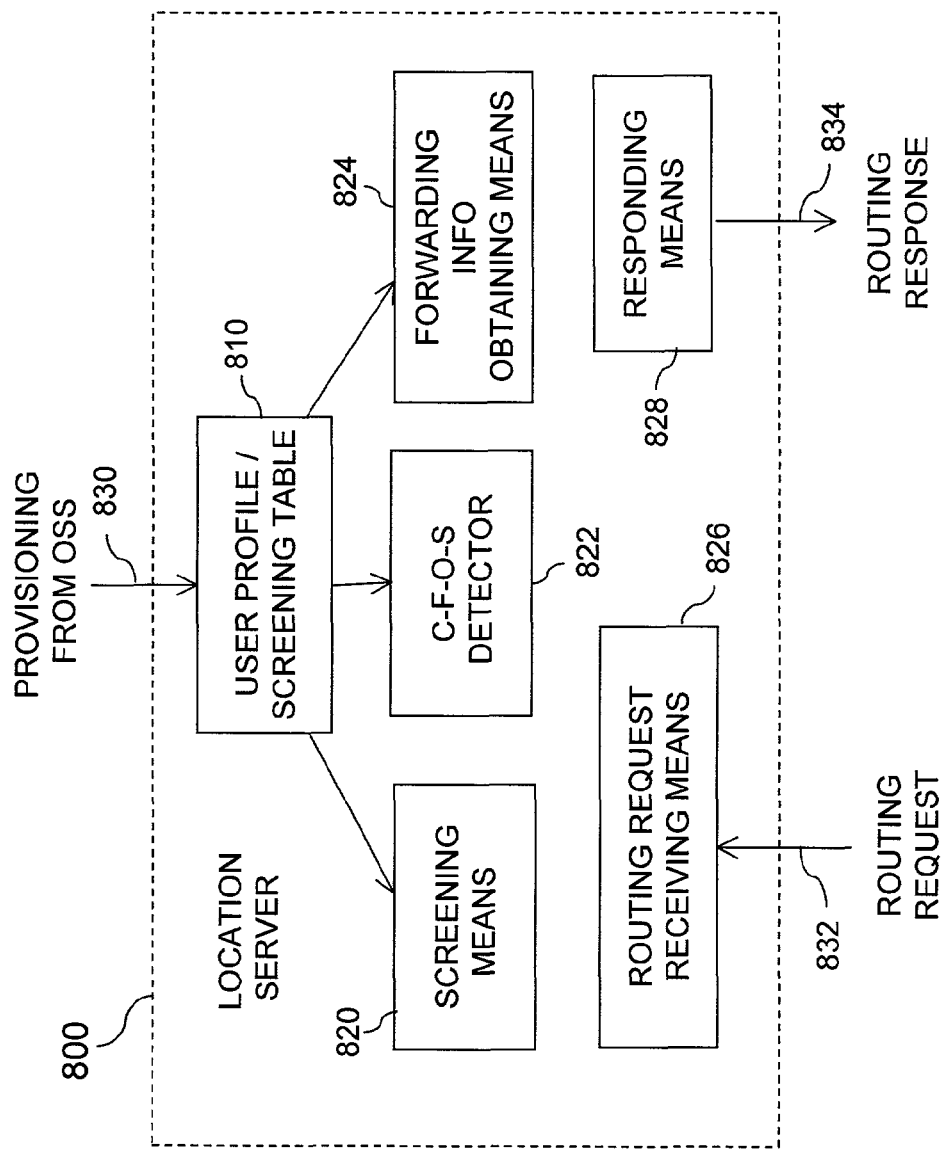
FIG. 8 is a diagram of the functional components of a location server supporting call-forwarding-on-screening in accordance with an exemplary embodiment of the present invention.

FIG. 8 is a diagram of the functional components of a location server supporting call-forwarding-on-screening in accordance with an exemplary embodiment of the present invention.

In FIG. 8, location server 800 is shown to comprise routing request receiving means 832 and routing request responding means 828. As described earlier in conjunction with FIGS. 1 and 2, routing requests are received along input 832 typically from a network server or proxy. Input 832 is typically a coupling to a data network for communications with the proxy. Output 834 is the means by which a response to a routing request is sent back to a proxy from responding means 828. Although shown separately, input 832 and output 834 may represent two-way communications through a common port.

User profile/screening table data store 810 serves as the repository for various user profile that affects the behavior of features on behalf of users as thoroughly described earlier herein. Data store 810 accepts provisioning or configuration input from OSS 121 via a provisioning interface 830. Provisioning interface 830 may in fact be coupled to OSS 121 through packet network 101.

Screening means 820 within location server 820 performs originating and terminating screening and may determine screening applicability and criteria based on information held within data store 810. Screening means 820 preferably implements the function of steps 414 and 420 in process 400 described earlier.

If screening means 820 makes a determination that a routing request does not pass terminating screening, then call-forwarding-on-screening (C-F-O-S) detector 822 acts to access user profile information in data store 810 and determine whether call forwarding should take place in response to the screening failure. This action may be compared to step 428 of process 400. C-F-O-S detector 822 may, for example, make this determination by testing if a value is present in CFOS field 316 described earlier.

Upon the determination by C-F-O-S detector 822, that forwarding is appropriate, forwarding information obtaining means 824 retrieves the forwarding information, such as a telephone number or IP address, from data store 810. This is reflective of step 430 in process 400. Responding means 828 then includes the forwarding information in a response to the appropriate proxy along output 834.

The computer system of FIG. 7 may be used to implement the location server depicted in FIG. 8.

While the present invention has been described in connection with a number of embodiments and implementations, the present invention is not so limited but covers various obvious modifications and equivalent arrangements, which fall within the purview of the appended claims.

What is claimed is:

1. A method comprising:
receiving, by one or more devices, a request from a device of an originating party to establish communications with a device of a destination party,
the request including information identifying a type of session and a quality level for the session;
determining, by the one or more devices, whether the request is permissible based on applying at least one criterion to at least one aspect associated with the request,
the determining whether the request is permissible including:
determining whether a type of an address, with which the device of the originating party or the device of the destination party is associated, corresponds to a telephone number or an Internet Protocol (IP) address, and
performing a screening process on the request,
the performing the screening process including:
performing a first screening process on the request using a first screening data structure that includes one or more telephone numbers when the type of the address corresponds to the telephone number, or
performing a second screening process on the request using a second screening data structure that includes one or more IP addresses when the type of the address corresponds to the IP address;
determining, by the one or more devices, that the request is not permissible based on performing the screening process on the request;
accessing, by the one or more devices and based on determining that the request is not permissible, a user profile, associated with the device of the destination party, to determine whether the device of the destination party is associated with a forwarding-on-screening feature;
determining, by the one or more devices, that the forwarding-on-screening feature is associated with the device of the destination party;
obtaining, by the one or more devices and from the user profile, forwarding contact information, associated with the device of the destination party, based on determining that the forwarding-on-screening feature is associated with the device of the destination party,
the forwarding contact information including a telephone number or an IP address; and
transmitting, by the one or more devices, a response to the request,
the response including the forwarding contact information, and
a plurality of addresses, associated with the destination party, being provided to the device of the origination party when the request is permissible.

2. The method of claim 1, where
the at least one aspect of the request relates to information identifying the device of the originating party, and
the screening process is performed based on the information identifying the device of the originating party.

3. The method of claim 1, where
the at least one aspect of the request relates to a location of the device of the originating party, and
the screening process is performed based on information identifying the location of the device of the originating party.

4. The method of claim 1, where
the at least one aspect of the request relates to a network device that forwarded the request, and
the screening process is performed based on information associated with the network device.

5. The method of claim 1, where
the at least one criterion is based on user profile information stored by the one or more devices, and
the screening process is performed based on the user profile information.

6. The method of claim 5, where the user profile information is included in the user profile of the device of the destination party.

7. The method of claim 5, where the user profile information is included in a user profile of the device of the originating party.

8. The method of claim 1, where
when determining that the forwarding-on-screening feature is associated with the device of the destination party, the method includes:
determining that the user profile information indicates that the forwarding-on-screening feature is enabled, and
the forwarding contact information is obtained based on determining that the user profile information indicates that the forwarding-on-screening feature is enabled.

9. The method of claim 1, where
at least one of:

the first screening data structure includes a first field configured to store a first value indicating whether the one or more telephone numbers are to be allowed or disallowed, or the second screening data structure includes a second field to store a second value indicating whether the one or more IP addresses are to be allowed or disallowed, and when performing the screening process, the method includes:
performing the screening process using the first screening data structure based on the first value in the first field or using the second screening data structure based on the second value in the second field.

10. The method of claim 1, where
the address, with which the device of the originating party or the device of the destination party is associated, includes an address associated with the device of the originating party and an address associated with the device of the destination party, and when performing the screening process, the method includes:
performing the screening process on the request for the address associated with the device of the originating party using the first data structure, and
performing the screening process on the request for the address associated with the device of the destination party using the second data structure.

11. The method of claim 1, where
at least one of:
the one or more telephone numbers include a range of public telephone numbers or a range of private telephone numbers, or
the one or more IP addresses include a range of IP addresses, and when performing the screening process, the method includes:
performing the screening process using the address and the range of public telephone numbers or the range of private telephone numbers or performing the screening process using the address and the range of IP addresses.

12. A server comprising:
one or more processors to:
receive a routing request relating to a request, from a device of an originating party, to establish communications with a device of a destination party,
the request including information identifying a type of session and a quality level for the session;
determine that the device of the originating party is not permitted to establish the communications with the device of the destination party,
the one or more processors, when determining that the device of the originating party is not permitted to establish the communications, being to:
determine whether a type of an address, with which the device of the originating party is associated, corresponds to a first telephone number or a first Internet Protocol (IP) address,
perform a screening process on the request using:
a first data structure that includes one or more telephone numbers when the type of the address, with which the device of the originating party is associated, corresponds to the first telephone number, or
a second data structure that includes one or more IP addresses when the type of the address, with which the device of the originating party is associated, corresponds to the first IP address,
determine whether a type of an address, with which the device of the destination party is associated, corresponds to a second telephone number or a second IP address, and
perform another screening process on the request using:
the first data structure when the type of the address, with the device of the destination party is associated, corresponds to the second telephone number, or
the second data structure when the type of the address, with which the device of the destination party is associated, corresponds to the second IP address;
determine that call-forwarding-on-screening is applicable to the device of the destination party;
obtain forwarding information based on determining that call-forwarding-on-screening is applicable to the device of the destination party,
the forwarding information including a telephone number associated with the device of the destination party or an IP address associated with the device of the destination party; and
send a response to the routing request,
the response comprising the forwarding information, a plurality of addresses, associated with the destination party, being provided to the device of the origination party when the device of the originating party is permitted to establish the communications with the device of the destination party.

13. The server of claim 12, where, when determining that call-forwarding-on-screening is applicable to the device of the destination party, the one or more processors are to:
access a user profile associated with the device of the destination party; and
determine, based on information in the user profile, that call-forwarding-on-screening is applicable to the device of the destination party.

14. The server of claim 12, where
the one or more telephone numbers include a range of telephone numbers,
the one or more IP addresses include a range of IP addresses,
when performing the screening process, the one or more processors are to:
perform the screening process using the address, with which the device of the originating party is associated, and the range of telephone numbers, or
perform the screening process using the address, with which the device of the originating party is associated, and the range of IP addresses, and
when determining that the device of the originating party is not permitted to establish the communications, the one or more processors are to:
determine that the device of the originating party is not permitted to establish the communications when the address, with which the device of the originating party is associated, is not included in the range of telephone numbers or is not included in the range of IP addresses.

15. A method comprising:
receiving, by one or more devices, a call from a device of an originating party for a device of a destination party, the call being based on a request including information identifying a type of session and a quality level for the session;

performing, by the one or more devices, a screening operation to determine whether to permit the call from the device of the originating party to the device of the destination party, the performing the screening operation including:
   determining whether a type of an address, with which the device of the originating party or the device of the destination party is associated, corresponds to a telephone number or an Internet Protocol (IP) address, and
   performing the screening operation using:
      a first data structure that includes one or more telephone numbers when the type of the address corresponds to the telephone number, or
      a second data structure that includes one or more IP addresses when the type of the address corresponds to the IP address;

determining, by the one or more devices, to not permit the call from the device of the originating party to the device of the destination party based on performing the screening operation;

accessing, by the one or more devices and based on determining to not permit the call from the device of the originating party, a user profile, associated with the device of the destination party, to determine whether the call, from the device of the originating party, is to be forwarded to an alternative destination;

determining, by the one or more devices, that the call, from the device of the originating party, is to be forwarded to the alternative destination;

obtaining, by the one or more devices, information associated with the alternative destination from the user profile,
   the information including a telephone number or an IP address; and causing, by the one or more devices, the call, from the device of the originating party, to be forward to the alternative destination using the telephone number or the IP address included in the information,
   a plurality of addresses, associated with the destination party, being provided to the device of the origination party when the call is permitted.

16. The method of claim 15, where the telephone number, included in the information, is associated with a device of an alternative party.

17. The method of claim 15, where
at least one of:
   the first data structure includes a first field to store a first value indicating whether the one or more telephone numbers are to be allowed or disallowed, or
   the second data structure includes a second field configured to store a second value indicating whether the one or more IP addresses are to be allowed or disallowed, and
when the performing the screening operation, the method includes:
   performing the screening operation using the address and the first value in the first field or using the address and the second value in the second field.

18. The method of claim 15, where
the address, with which the device of the originating party or the device of the destination party is associated, includes an address associated with the device of the originating party and an address associated with the device of the destination party, and
when performing the screening operation, the method includes:
   performing a first screening operation based on originating party information, the originating party information including the address associated with the device of the originating party, and
   performing a second screening operation based on destination party information, the destination party information including the address associated with the device of the destination party.

19. The method of claim 15, where
at least one of:
   the one or more telephone numbers include a range of public telephone numbers or a range of private telephone numbers, or
   the one or more IP addresses includes a range of IP addresses, and
when performing the screening operation, the method includes:
   performing the screening operation based on:
      the address and the range of public telephone numbers or the range of private telephone numbers, or
      the address and the range of IP addresses.

20. The method of claim 15, where, when determining to not permit the call from the device of the originating party to the device of the destination party based on performing the screening operation, the method includes:
   accessing the user profile; and
   determining, based on information in the user profile, that call-forwarding-on-screening is applicable to the device of the destination party.

* * * * *